(12) United States Patent
Lee et al.

(10) Patent No.: US 9,748,791 B2
(45) Date of Patent: Aug. 29, 2017

(54) RECEPTION DEVICE FOR WIRELESS CHARGING

(71) Applicant: HITACHI-LG DATA STORAGE KOREA, INC., Seoul (KR)

(72) Inventors: Hyunmin Lee, Seoul (KR); Seonghwan Choi, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 155 days.

(21) Appl. No.: 14/603,944

(22) Filed: Jan. 23, 2015

(65) Prior Publication Data
US 2015/0194840 A1    Jul. 9, 2015

(30) Foreign Application Priority Data
Jan. 7, 2014  (KR) .......................... 10-2014-0002034

(51) Int. Cl.
  *H02J 7/00*  (2006.01)
  *H02J 7/02*  (2016.01)
  *H02J 50/10* (2016.01)

(52) U.S. Cl.
  CPC .............. *H02J 7/025* (2013.01); *H02J 50/10* (2016.02)

(58) Field of Classification Search
  USPC .................................................. 320/107–115
  See application file for complete search history.

(56) References Cited

U.S. PATENT DOCUMENTS

| | | | |
|---|---|---|---|
| 2011/0254503 A1* | 10/2011 | Widmer ................ | B60L 11/182 320/108 |
| 2012/0206098 A1* | 8/2012 | Kim ...................... | B60L 11/182 320/108 |

* cited by examiner

*Primary Examiner* — Binh Tat
(74) *Attorney, Agent, or Firm* — Birch, Stewart, Kolasch & Birch, LLP

(57) ABSTRACT

Disclosed herein is a reception device for wireless charging. The reception device for wireless charging may include a reception antenna configured to generate an electric current based on a change of magnetism and a charging circuit unit configured to convert the electric current generated by the reception antenna into direct current. The reception antenna and the charging circuit unit may be connected to a flexible board. Accordingly, the reception device can be attached to the casing of a smart terminal while minimizing a change in the thickness of the smart terminal. A task for connecting the antenna and charging circuit unit of the reception device can be eliminated. A wireless charging function can be assigned to a smart terminal by simply replacing the casing of the smart terminal not having the wireless charging function.

5 Claims, 3 Drawing Sheets

RECEPTION DEVICE FOR WIRELESS CHARGING

CROSS REFERENCE TO RELATED APPLICATIONS

This non-provisional application claims the benefit under 35 U.S.C. §119(a) to Patent Application No. 10-2014-0002034, filed in the Republic of Korean on Jan. 7, 2014, the entire contents of which are hereby expressly incorporated by reference into the present application.

BACKGROUND OF THE INVENTION

Field of the Invention

The present invention relates to a reception device for wireless charging and, more particularly, to a device mounted on the rear casing of a terminal, such as a smart phone, and configured to enable wireless charging for the terminal.

Discussion of the Related Art

In recent years, as communication and information processing technology are advanced, the use of portable smart terminals, such as smart phones, is gradually increased. With the development of technologies, terminals of new models having improved performance continue to be released.

Furthermore, a charging method that is most widely used is a method of directly connecting an adaptor connected to power to a smart terminal and charging the smart phone using external power or connecting the adaptor to a smart terminal through the USB terminal of a host and charging the smart terminal using USB power supplied by the host.

In order to solve a problem in that a smart terminal must be directly connected to an adaptor or a host through a connection line or a problem inherent in a contact charging method that occurs when the contact terminal of a smart terminal is externally exposed, a contactless or wireless charging method for charging the battery using magnetic coupling without an electrical contact is gradually applied to smart terminals.

In recent products, a reception device for wireless charging is basically installed in a terminal and the casing or replaceable battery of a terminal, enabling wireless charging. In contrast, in the case of a product from which a casing is separated in order to replace a battery from among products not having a wireless charging reception function, the casing on which a reception device for wireless charging has been mounted is developed and separately sold.

In order to implement a wireless charging function in a terminal after the terminal is released, however, a wireless charging reception device must be separately mounted on a casing. Accordingly, there is a problem in that it is difficult to use the terminal or an external appearance of the terminal is poor because the thickness of the casing becomes thicker than the original thickness of the casing.

SUMMARY OF THE INVENTION

Accordingly, the present invention has been made to solve the above problems occurring in the prior art, and an object of the present invention is to provide a reception device for wireless charging, which is capable of implementing a wireless charging function in a terminal.

Another object of the present invention is to provide a reception device for wireless charging, which may be attached to the casing of a terminal.

Yet another object of the present invention is to reduce the thickness of a connection unit for connecting an antenna and a circuit that form a reception device for wireless charging.

In accordance with an aspect of the present invention, a reception device for wireless charging may include a reception antenna configured to generate an electric current based on a change of magnetism and a charging circuit unit configured to convert the electric current generated by the reception antenna into direct current, wherein the reception antenna and the charging circuit unit may be connected to a flexible board.

In one embodiment, the reception antenna may be formed in a pattern form in the flexible board connecting the reception antenna and the charging circuit unit.

In one embodiment, the flexible board may include exposed terminals extended from the charging circuit unit and connected to a main body.

In one embodiment, the reception device may further include an electromagnetic wave absorption sheet.

In one embodiment, the electromagnetic wave absorption sheet may be configured to cover at least part of the reception antenna and the charging circuit unit.

In one embodiment, the charging circuit unit may be configured to further include at least one of the battery protection unit and the control unit.

DETAILED DESCRIPTION OF THE EMBODIMENTS

Figure 1:
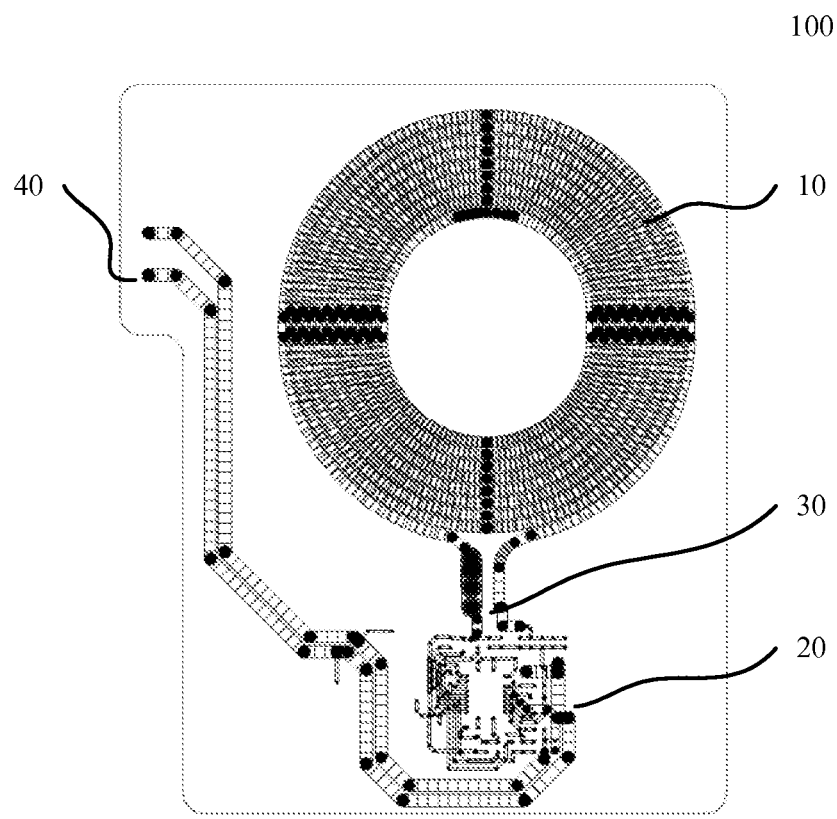
FIG. 1 is a plan view of a reception device for wireless charging in accordance with an embodiment of the present invention.

The above object, characteristics, and merits of the present invention will become more apparent from the following detailed description taken in conjunction with the accompanying drawings. The present invention may be modified in various ways and may have some embodiments. Hereinafter, some exemplary embodiments of the present invention will be illustrated in the accompanying drawings and described in detail. The same reference numerals basically designate the same elements throughout the drawings. Furthermore, a detailed description of known functions or elements relating to the present invention will be omitted if it is deemed to make the gist of the present invention unnecessarily vague. Numbers (e.g., the first and the second) used to describe the present invention are merely identification symbols for distinguishing one element from the other element.

A reception device for wireless charging related to the present invention is described in more detail below with reference to the accompanying drawings. It is to be noted that the suffixes of the elements used in the following description, such as "module" and "unit," are assigned or interchangeable with each other by taking only the easiness of writing this specification into consideration, but in themselves are not particularly given importance and roles.

A reception device for wireless charging is a device for being supplied with external power through an antenna in accordance with a wireless power transmission and reception method and charging a battery using the supplied power. The reception device for wireless charging may be configured to include a reception antenna coil for being supplied with external power and a circuit unit for controlling the reception of power and converting received power into an electric current for charging the battery.

A reception device for wireless charging needs to be fabricated in a thin film form so that it is installed in the rear casing of a smart device from which a casing is separated in order to replace a battery. In a prior art, a reception antenna including a reception coil and a circuit unit for charging a battery using an electric current transferred by the reception coil are separately designed and connected. This makes it difficult to implement a thin film type.

A conventional reception device for wireless charging provides only a wireless coil for reception (it is assumed that a circuit unit is present separately from a terminal or battery) or is implemented in such a way as to attach a coil to a charging circuit unit. In this case, the thickness of a connection unit is inevitably increased because the charging circuit unit and the reception coil are connected by soldering.

The reception device for wireless charging is provided as a product along with the rear casing of a terminal because it is difficult to reduce the thickness of the connection unit. In this case, the thickness of the rear casing inevitably becomes thicker than the original thickness of the rear casing of the terminal.

FIG. 1 is a plan view of a reception device for wireless charging in accordance with an embodiment of the present invention.

The reception device 100 for wireless charging in accordance with an embodiment of the present invention may be configured to include a reception antenna 10 configured to function as an induction coil and to generate an induction current using an external magnetic field, a charging circuit unit 20 configured to rectify the induction current generated by the reception antenna 10, a connection unit 30, and exposed terminals 40. The reception antenna 10 of an ultra-thin coil and the charging circuit unit 20 may be integrated and implemented in a Flexible Printed Circuit Board (FPCB) form, thereby being capable of eliminating a task for the connection unit 30 and reducing the thickness.

The reception antenna 10 may be implemented in a pattern form within an ultra-thin FPCB of 0.2 mm not a wire coil having a thickness of about 0.4 mm. For the purposes of the shielding or absorption of electromagnetic waves with the reception antenna 10 of an FPCB form, the reception antenna 10 is combined with a sheet having a thickness of about 0.2 mm, thereby being capable of sufficiently reducing the thickness of the entire module when the module is formed. Accordingly, the reception antenna 10 can be disposed within the rear casing of a terminal even without a change of the rear casing.

Furthermore, since the reception antenna 10 and the charging circuit unit 20 are integrated in an FPCB form, modifications are possible according to terminals or terminal casings having various forms.

Figure 2:
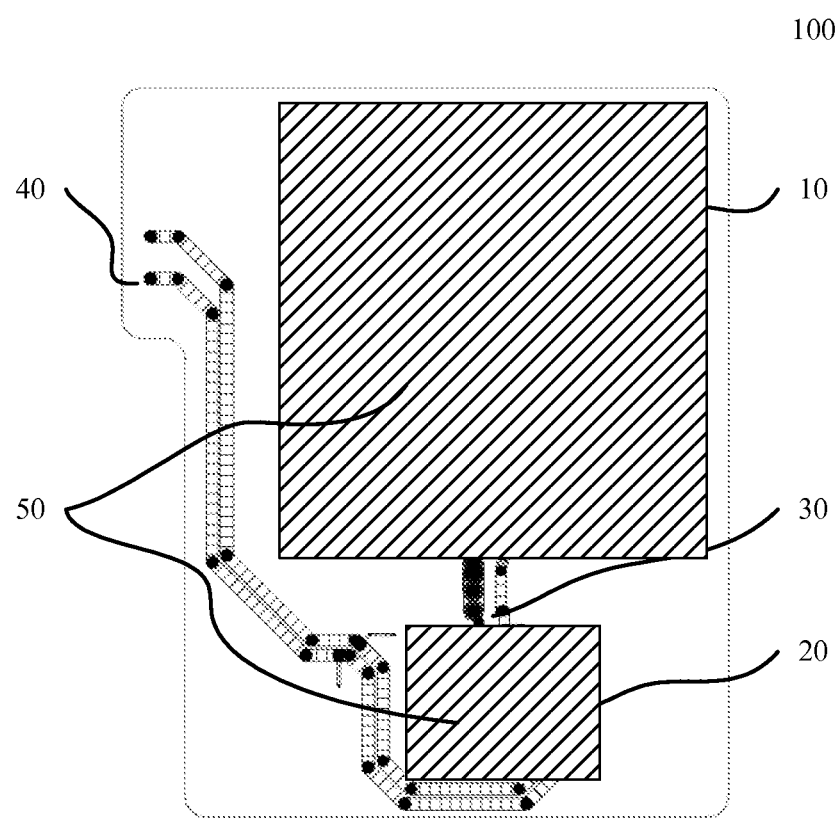
FIG. 2 illustrates that part of the reception device for wireless charging in accordance with an embodiment of the present invention is covered with an electromagnetic wave absorption sheet.

FIG. 2 illustrates that part of the reception device for wireless charging in accordance with an embodiment of the present invention is covered with an electromagnetic wave absorption sheet. A sheet 50 may be attached to regions corresponding to the reception antenna 10 and the charging circuit unit 20 or may cover some of or the entire region of the reception device for wireless charging other than the exposed terminals 40.

The sheet 50 may be formed of a ferrite sheet in order to remove electromagnetic waves and noise and improve efficiency of an induction current that flows into a battery through the charging circuit unit 20.

Figure 3:
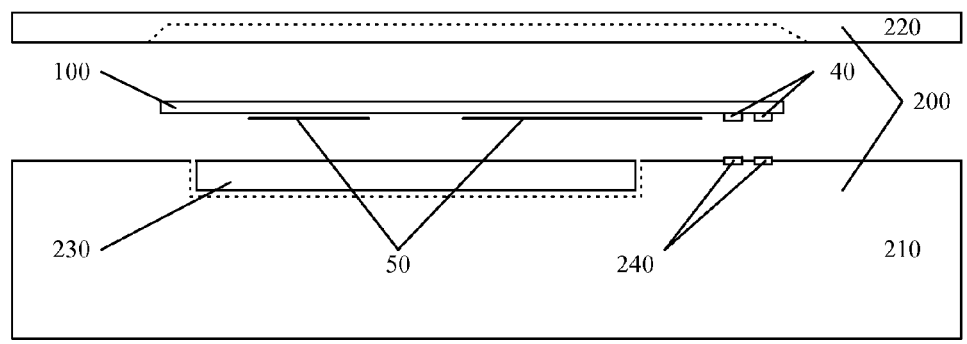
FIG. 3 is a cross-sectional view illustrating that the reception device for wireless charging in accordance with an embodiment of the present invention is attached to the casing of a smart terminal.

FIG. 3 is a cross-sectional view illustrating that the reception device for wireless charging in accordance with an embodiment of the present invention is attached to the casing of a smart terminal.

The reception device 100 for wireless charging in accordance with an embodiment of the present invention may be attached to the inside of a rear casing 220 that covers the rear of the main body 210 of a terminal 200. The rear casing 220 may be attached to or detached from the main body 210 so that a battery 230 inserted into the main body 210 of the terminal 200 is replaceable. A space in which the reception device 100 for wireless charging can be seated (i.e., a space indicated by a dotted line of FIG. 3 in the rear casing) may be provided in the rear casing 220.

In the reception device 100 for wireless charging in accordance with an embodiment of the present invention, the sheet 50 is attached in a direction toward the main body 210 of the terminal 200 and is seated in the rear casing 220 of the terminal 200. The exposed terminals 40 are exposed in a direction toward the main body 210 of the terminal 200 and are disposed in locations corresponding to terminals 240 provided in the rear of the main body 210 of the terminal 200. When the main body 210 and rear casing 220 of the terminal 200 are coupled, the exposed terminals 40 are electrically connected to the terminals 240 of the terminal 200. The exposed terminals 40 may be physically connected to the terminals 240 of the terminal 200 by means of pressing pressure generated when the main body 210 and rear casing 220 of the terminal 200 are coupled.

The terminals 240 of the terminal 200 may be electrically connected to the battery 230 that has been inserted into a space provided in the main body 210 of the terminal 200 (i.e., a space indicated by a dotted line in the main body 210 of the terminal 200) through a connection line provided within the main body 210 of the terminal 200.

Figure 4:
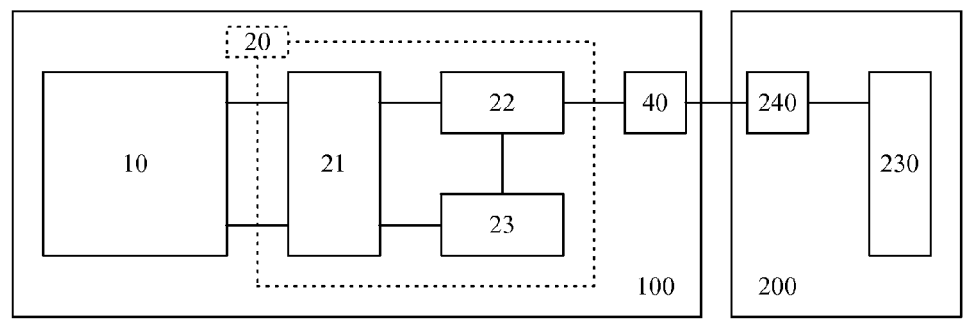
FIG. 4 illustrates the configuration of a circuit unit included in the reception device for wireless charging in accordance with an embodiment of the present invention.

FIG. 4 illustrates the configuration of a circuit unit included in the reception device for wireless charging in accordance with an embodiment of the present invention.

The reception device 100 for wireless charging and the terminal 200 are connected by physical contacts between the exposed terminals 40 and the terminals 240. Accordingly, a charging electric current generated by the charging circuit unit 20 of the reception device 100 for wireless charging can be transferred to the battery 230 inserted into the terminal 100.

The charging circuit unit 20 may be configured to include a power conversion unit 21, a battery protection unit 22, and a control unit 23. The power conversion unit 21 functions to convert an induction current generated by the reception antenna 10 into direct current. The battery protection unit 22 is connected to the exposed terminals 40, and it functions to prevent an excessive rise of voltage output by the power conversion unit 21. The control unit 23 controls the power conversion unit 21 and may perform communication with a power transmission unit.

The charging circuit unit 20 may be configured to include all of the power conversion unit 21, the battery protection unit 22, and the control unit 23, may be configured to include only the power conversion unit 21, may be configured to include only the power conversion unit 21 and the battery protection unit 22, or may be configured to include the power conversion unit 21 and the control unit 23. Remaining elements not included in the charging circuit unit 20 may be configured within the terminal 200.

A wireless power transmission and reception method between a power transmission unit and a power reception unit may include an electromagnetic induction method or a resonant magnetic induction method, for example, but the present invention is not limited thereto.

Accordingly, the reception device for wireless charging can be attached to the casing of a smart terminal while minimizing a change in the thickness of the smart terminal.

Furthermore, a task for connecting the antenna and charging circuit unit of the reception device for wireless charging can be eliminated.

Furthermore, a wireless charging function can be assigned to a smart terminal by simply replacing the casing of the smart terminal not having the wireless charging function.

Furthermore, a wireless charging device can be easily changed according to terminals or terminal casings of various forms because the reception antenna and the charging circuit unit are integrated in an FPCB form.

The present invention is not limited to the aforementioned embodiments. It is evident to those skilled in the art to which the present invention pertains that the present invention may be substituted, modified, and changed in various ways without departing from the technical spirit of the present invention.

What is claimed is:

1. A reception device for wireless charging, comprising:
    a reception antenna formed in a pattern form in a flexible board and configured to generate an electric current based on a change of magnetism; and
    a charging circuit unit configured to convert the electric current generated by the reception antenna into direct current,
    wherein the charging circuit unit is connected to the reception antenna via the flexible board,
    wherein the charging circuit unit comprises a power conversion unit configured to convert an induction current generated by the reception antenna into direct current, and
    wherein the charging circuit unit further comprise comprises at least one of the battery protection unit configured to prevent an excessive rise in voltage output by the power conversion unit and a control unit configured to perform communication with a power transmission unit.

2. The reception device of claim 1, wherein the flexible board comprises exposed terminals extended from the charging circuit unit and connected to a main body.

3. The reception device of claim 1, further comprising an electromagnetic wave absorption sheet.

4. The reception device of claim 3, wherein the electromagnetic wave absorption sheet is configured to cover at least part of the reception antenna and the charging circuit unit.

5. The reception device of claim 1, wherein the reception antenna and the charging circuit unit are integrated in the flexible board.

\* \* \* \* \*